Dec. 20, 1960  M. G. JACOBSON  2,965,842
DETECTION OF AMBIENT COMPONENTS BY SEMICONDUCTORS
Filed May 6, 1957  5 Sheets-Sheet 1

INVENTOR
MOSES G. JACOBSON
BY
Mason, Kolehmainen, Rathburn and Wyss.
ATTORNEYS

Dec. 20, 1960 M. G. JACOBSON 2,965,842
DETECTION OF AMBIENT COMPONENTS BY SEMICONDUCTORS
Filed May 6, 1957 5 Sheets-Sheet 2

INVENTOR.
MOSES G. JACOBSON
BY
Mason, Kolehmainen, Rathburn and Wyss
ATTORNEYS

Dec. 20, 1960 M. G. JACOBSON 2,965,842
DETECTION OF AMBIENT COMPONENTS BY SEMICONDUCTORS
Filed May 6, 1957 5 Sheets-Sheet 3

INVENTOR
MOSES G. JACOBSON
BY
Mason, Kolehmainen, Rathburn and Wyss.
ATTORNEYS

Dec. 20, 1960 M. G. JACOBSON 2,965,842
DETECTION OF AMBIENT COMPONENTS BY SEMICONDUCTORS
Filed May 6, 1957 5 Sheets-Sheet 5
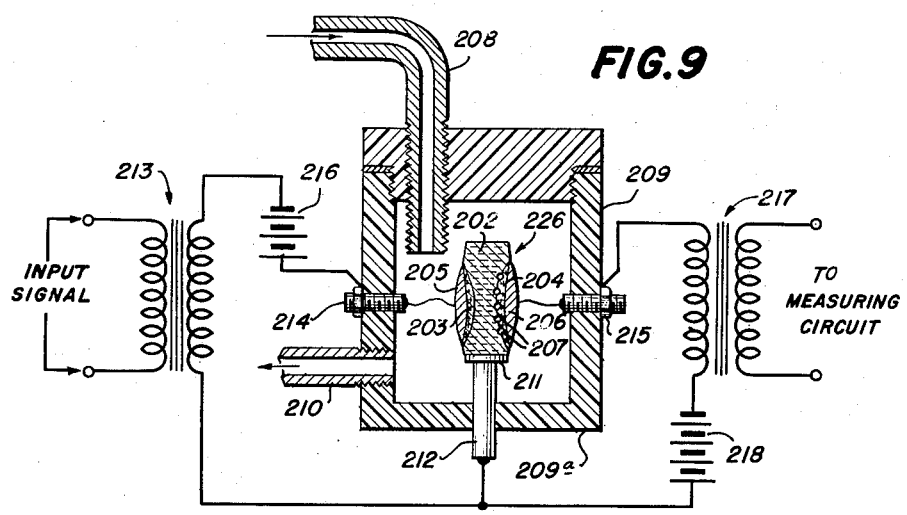
FIG.9
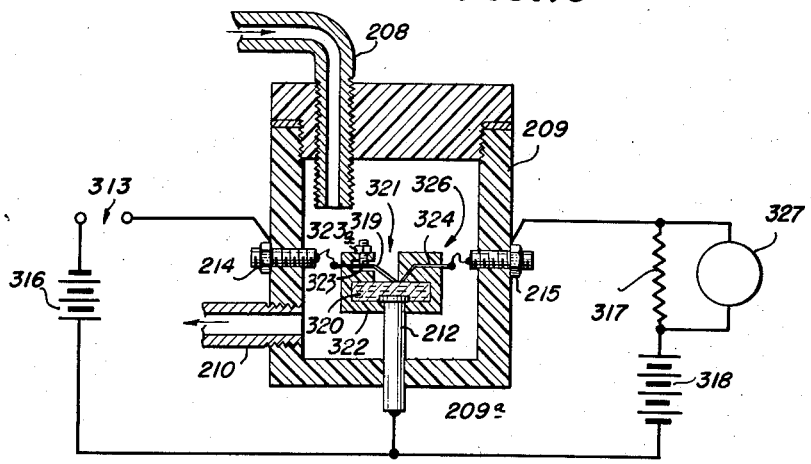
FIG.10
FIG.11
INVENTOR
MOSES G. JACOBSON
BY
Mason, Kolehmainen, Rathburn and Wyss.
ATTORNEYS United States Patent Office 2,965,842
Patented Dec. 20, 1960

2,965,842

DETECTION OF AMBIENT COMPONENTS BY SEMICONDUCTORS

Moses G. Jacobson, Penn Township, Allegheny County, Pa., assignor to Mine Safety Appliances Company, Pittsburgh, Pa., a corporation of Pennsylvania Filed May 6, 1957, Ser. No. 657,271

48 Claims. (Cl. 324—65)

The present invention relates generally to the detection of ambient components by observing their effects on semiconductor devices and, more particularly, to improved methods and apparatus for detecting and at least partially analyzing the constituents of an ambient by determining the effect of these constituents upon the electrical characteristics of a semiconductor device.

It has been known for some time that certain electrical properties of semiconductors are changed when their surface is exposed to certain gases and vapors such as, for example, oxygen, ozone, water vapor, alcohol vapor, and others. Considerable research has been carried out on these phenomena for the purpose of minimizing or removing their inconsistent effects on such semiconductor devices as diodes and transistors used as rectifiers, detectors, oscillators, amplifiers, etc. Since, however, only certain gases or components of gases cause these changes in the electrical properties of semiconductors, it is proposed, in accordance with the present invention, to utilize the described phenomena to detect the presence of these components in the ambient atmosphere surrounding the semiconductor.

In the research work referred to above, the effect of ambients on semiconductors was studied, for example, by measuring surface conductivity and the Hall effect. While for the purpose of obtaining information as to the charge carriers involved, their mobilities, etc. and for testing of various theoretical concepts, such measurements may be advantageous, the instrumentation involved is cumbersome and entirely unsuitable for a portable instrument, such as a gas detector. Moreover, the results obtained so far by these methods have proven quite variable, very inconsistent and even controversial.

In one such research project a fine mesh metal screen was placed a small distance from the surface of a semiconductor specimen and the difference of potential existing between the screen and the specimen surface was measured using the elaborate equipment required for measurement of surface potentials. To obtain some degree of reversibility and reproducibility a cycling procedure was adopted, which included the steps of producing a spark discharge in dry oxygen to develop ozone surrounding the specimen, changing to wet oxygen or wet nitrogen and finishing with dry oxygen. In some of these experiments, the surface of the specimen was illuminated through the screen in an attempt to stabilize the effects of variations in the ambient. In certain of these experiments surface conductivity and its changes under the influence of various ambients and the electrical current, except for some undesired but unavoidable stray flow passing into the bulk of the specimen, were measured substantially along the surface of the specimen between ohmic electrodes.

Other investigations dealt with the effect of ambients in the presence of strong electrostatic fields applied across metal electrodes oriented in proximity to the semiconductor junction. However, in these investigations the effects of the ambients were sufficiently strong to be observed only when the ambient between the additional electrodes and the semiconductor was in liquid form.

In accordance with the present invention, it has been found that the most consistent and also the most practical method for utilizing the effect of gases and vapors on semiconductors for detection and quantitative determination of gases or vapors is to employ a device having one or more rectifying contacts or junctions between a semiconductor and a metal, between a semiconductor and another semiconductor of different conductivity, or between two metals with substantially different electrical characteristics. In the ensuing description these contacts or junctions are referred to generally as boundaries between two materials of substantially different conductivities, which boundaries usually provide some degree of rectification with respect to passage of electric current. The simplest form of a device having such a boundary usually has two terminals and is called a diode. Semiconductors used in devices of the character indicated are classified into N (negative) type and P (positive) type. In the N type semiconductors the majority of current carriers are negatively charged particles, which in germanium and silicon, according to the most accepted theory, are electrons while in the P type semiconductors the majority of current carriers have positive charges, and in germanium and silicon they are the so-called "holes" or localized electron deficiencies. In a germanium or silicon N type diode, rectification of alternating electric current occurs because in one direction of electric current flow, which is called the "forward direction," the current is carried by both the majority carriers (electrons in this case) and minority carriers (holes in this case) across the junction without much resistance, while in the other current direction, called the "reverse or inverse" or sometimes the "back" direction, only very few of the majority carriers are able to cross the junction while most of the minority carriers are crossing it freely. Thus, because the minority carriers are present only in small numbers and also in the case of germanium have a lower mobility, the electrical resistance in the reverse direction is much higher than in the forward direction. In diodes formed by contact between an N type semiconductor and a metal, the inverse current direction is the one prevailing when the metal is connected to the negative pole and the semiconductor to the positive pole of a battery; in the "forward direction" the metal is connected to the positive terminal and the semiconductor to the negative terminal. For P type semiconductors all of the above polarities are reversed.

Thus far the generally accepted theories agree as to what occurs when rectification is produced by a semiconductor diode. But from here on, and especially as to explaining just why the majority carriers are prevented from crossing the junction when the polarity for the reverse direction is applied, the theories differ. No theory in existence at present is able satisfactorily to account even for all basic facts. Therefore, no further theoretical pictures or explanations shall be given in the present disclosure, and only descriptions of facts as established by experiments of applicant or others will be used except in those instances where the accepted theories can be used to lend understanding to the description.

The method of the present invention distinguishes from the prior experiments and investigations described briefly above, in that, among other things, the electric current measured passes through a junction or contact between a semiconductor and another semiconductor or metal instead of flowing entirely along the surface or through the bulk of the material. This creates several important differences; first, the current carriers must cross a semiconductor surface, that is, before reaching the bulk of the material they must penetrate a thin layer which is in the so-called surface state. This layer or state usually differs substantially in its electrical characteristics from the bulk of the material and, in addition, their electrical characteristics are affected by a number of different ambients. Second, due to the presence of the contacting or adjoining other conductors at the point of influence, the semiconductor surface in the vicinity of the contact or junction is charged, thus forming what is termed in some theories an electric double layer or blocking layer. Third, the ambient has to influence only the relatively small area around the diode boundary instead of the entire surface area between two ohmic electrodes. Fourth, the measurement of ambient effect is usually performed with the current in the reverse direction using the change in number and mobility of minority carriers, thus substantially eliminating the effect on majority carriers, which in many cases would complicate matters.

To provide a device capable of determining ambient concentrations by observing their effects on a semiconductor, a few basic considerations are of paramount importance. First, the semiconductor device itself must be so designed that it possesses a high sensitivity to the ambient; that is, a relatively small change in the ambient produces a relatively large change in the electrical characteristic of the semiconductor. In most of the prior investigations by others, as well as in the early stages of development of the present invention, it was necessary to employ vacuum tube amplifiers to observe the effects of gases and vapors even in high concentrations. By the present invention, however, methods and means have been developed whereby it is now possible not only to observe the effects of gases and vapors when present in considerable concentrations, but to accurately measure many of them even when present in concentrations of the order of parts per million and to do this with ordinary commercial electric meters and relatively simple circuitry without any vacuum tube or other amplifiers. This has been achieved primarily by the development of special type diodes, transistors and other multielectrode devices which are provided with boundaries between electrically dissimilar elements with high current carrying capacity and which are adapted to have substantial parts of some of these boundaries exposed to a gas to be tested. Certain of these diodes and transistors are described herein while others are disclosed and claimed in applicant's copending applications Serial No. 657,304 and Serial No. 657,343, filed concurrently herewith.

A second condition which must be satisfied to permit the use of a semiconductor type device in gas detection is that the sensitivity must be so stabilized that the measurements obtained in the presence of a particular ambient are consistently repeatable at any time regardless of what other ambients and/or electrical influence the device may be exposed to between tests or measurements. To achieve this, all the processes, electrical as well as chemical, occurring in the device, when subjected to various ambients, with or without the presence of electrical influences, must be as completely reversible as possible; otherwise, if any significant irreversible change has taken place in the device, it will not come back to the original condition after the reactive component in the ambient is removed and the result of the next test will obviously differ from the preceding test. In addition, the permanent change left from the preceding test very often continues slowly to increase, and in this way the sensitivity to the constituent being analyzed or measured after a while is materially decreased and sometimes even entirely destroyed. It also happens sometimes, that the change left over from a preceding test makes the device sensitive to changes in other constituents that are normally contained in the standard ambient, and if these latter influences are also irreversible, obviously the changes resulting from the particular component of interest become very inconsistent.

Minimizing the effects of irreversibility of the processes involved by subjecting the semiconductor devices to a cycle of ambients in definite succession, the last in the cycle, as for instance ozone in the research referred to above, being expected to bring the device back in some degree to its initial condition, is a stop gap, which permits certain scientific conclusions, as to the character of the ambient's effect to be drawn. Illumination and high electric fields are helpful in somewhat improving reversibility with respect to electrical characteristics. However, disregarding the complexity of instrumentation and technical skill required and the severe limitations imposed by the necessity of maintaining a predetermined sequence of ambients, none of these methods, nor any combination of them, have achieved the degree of reversibility of effects and repeatability of results, necessary to make possible quantitative determinations of even the most active ambient components.

The process of stabilization of sensitivity employed in this invention confers upon the semiconductor devices a very high degree of reversibility for all ambient components. As a consequence, after once being subjected to this relatively simple process, the semiconductor device used as a detecting element not only produces substantially identical measurements in successive tests for a long time, but also is largely independent of the character of the ambients and electrical conditions imposed upon the device in the intervals between tests.

A third important feature which must be achieved to permit use of a semiconductor in the detection of an ambient is that the effect of various external media affecting the electrical measurements, such as contact pressure, ambient pressure, ambient temperature, and the like must be reduced to an absolute minimum so that consistent measurements can be obtained. A fourth factor to be considered is that the time required for the semiconductor device to respond to a change in ambient must be short so that the measurements can be made rapidly. Applicant has found it possible to reduce this response time to two minutes or less while in all prior experimentation a period of from five to twenty minutes was required following a change in the ambient in order to produce measurements having at least some degree of consistency or stability.

In view of the foregoing discussion, it will be recognized that the principal object of the present invention is to provide a new method and apparatus utilizing a semiconductive material in a device for detecting components of an ambient.

A further object of the present invention is to provide a new method and apparatus employing semiconductive material to detect and determine the quantity of certain gases in an ambient.

Still another object of the present invention is to provide a novel gas detecting method and apparatus employing a semiconductive device as the detecting element while at the same time using only conventional electrical meters and a minimum number of electrical components and which does not require the use of electronic or other amplifiers.

A still further object of the present invention is to provide a novel method and apparatus for stabilizing the sensitivity of a semiconductor device by making all effects of the ambient substantially reversible in order to permit the device to be used as a gas detector.

Yet another object of the present invention is to provide a method and apparatus according to the preceding object in which the stabilization is carried out in a minimum amount of time by conventional electrical circuitry without requiring the use of elaborate and expensive external media.

It is also an object of the present invention to provide a novel method and apparatus using a semiconductive material as the detecting element in which different electrical characteristics of the material can be determined to provide a considerable degree of selectivity, thereby facilitating distinction between the effects of different gases on the material.

Briefly, the above and further objects are realized in accordance with the present invention by providing methods and apparatus for measuring certain characteristics of a semiconductor device to indicate the presence or absence of certain gases or particles in the ambient atmosphere of the junction. In accordance with another aspect of the invention, methods and apparatus are provided for enabling the stabilization of the sensitivity of a semiconductor junction to the effects of the ambient atmosphere so that consistency of measurement is possible.

The invention, both as to organization and method of operation, together with further objects and advantages thereof, will best be understood by reference to the following detailed description taken in connection with the accompanying drawings, in which:

Fig. 9 is a diagrammatic view partially in section illustrating a circuit employing a junction type transistor used in the detection of ambient components;

Fig. 10 is a view similar to Fig. 9 but showing the use of a contact type transistor as the sensing element; and Fig. 11 is an enlarged perspective view illustrating one of the contacts employed in the transistor shown in Fig. 10.

Figure 1:
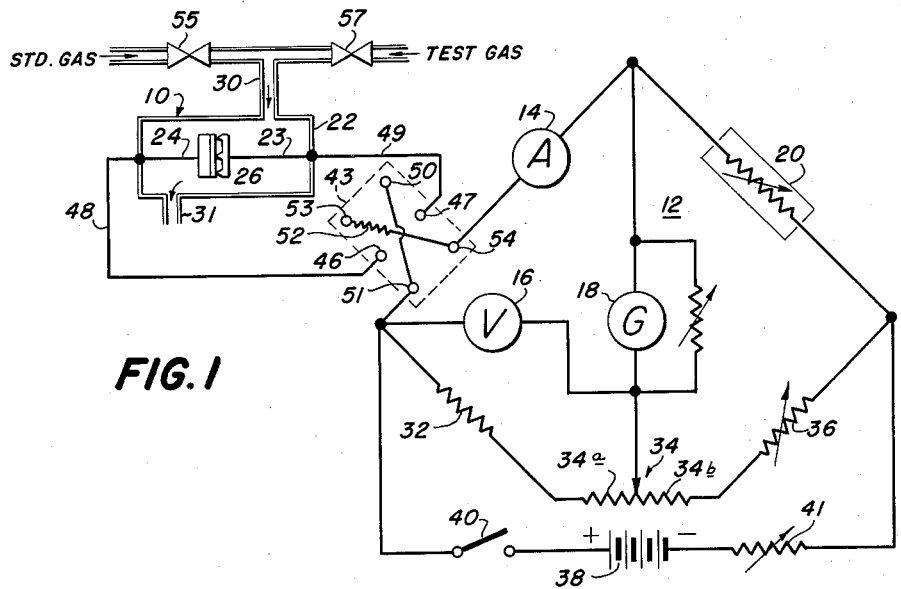
Fig. 1 is an electric circuit illustrating how the present invention may be carried out when D.C. is used as a source of power.

In order to avoid the lengthy description in the specification and in the claims of the various particles and gases that can be detected in accordance with this invention, they are described herein as containing "electrically reactive particles," it being understood that this term includes ions, polar molecules, charged particles, easily polarized and easily ionizable molecules and atoms. Also, the electrical characteristics of a semiconductor which can be utilized in accordance with this invention for detecting and at least partially analyzing gases are surface potential, charge density, conductivity, work function, Fermi levels of electrons or holes, the mobility of electrons or holes, etc. When dealing with junctions between a metal and a semiconductor, junctions between two different semiconductors, or junctions between two different metals, the electrical parameters that may be measured to determine these electrical characteristics are: electrical resistance or conductance in the forward or reverse direction, electrical current passed, D.C. voltage drop across the junction in either of the two directions, thermoelectric potential, capacitance, impedance, frequency modulation, pulse modulation, etc., with or without D.C. bias in either of the current directions. Any one or any combination of these parameters may be affected by the presence of gases or vapors having components containing the above-described electrically reactive particles at the contact or junction between electrically dissimilar elements of a detecting device.

As previously mentioned, various attempts have been made in the past to stabilize the influence of ambient gases containing electrically reactive particles on semiconductor characteristics in order to obtain results consistent enough to test the validity of some scientific theories and hypotheses. However, such attempts have thus far not been very successful even for research purposes, and the methods employed are entirely unsatisfactory for a practical method and apparatus for detection of ambient components, both because of the insufficient reproducibility of the results obtained and the greatly increased complexity of the instrumentation which makes them unsuitable for use anywhere except in research laboratories. In accordance with the present invention the electrical parameters are measured preferably during the reverse current phase through the semiconductor contact or junction or more generally through the semiconductor boundary, to indicate the presence of certain gases in the ambient atmosphere and prior to such measurement the semiconductor boundary is stabilized to the influence of the ambient atmosphere by passing a forward current of predetermined value through the boundary for a predetermined time while this boundary is exposed to gases containing at least a small quantity of electrically reactive particles such as water vapor, for example.

Although the amount of knowledge concerning the solid state of matter, and particularly semiconductors, is not at this time sufficient to enable an exact description as to what occurs at the semiconductor boundary when the stabilization process of the present invention is carried out, the following theoretical explanation of the phenomena is offered. A number of observations which applicant has made lead to the belief that during this stabilization process both physical and electrochemical changes take plate.

As previously indicated, applicant has found that when carrying out the stabilization of sensitvity process by passing forward current through the rectifying boundary, the boundary area must be surrounded by air containing at least a small quantity of gases containing electrically reactive particles such as water vapor. The process does not work well with pure non-ionized air or nitrogen, but it does work when small quantities of a gas with a polar molecule, other than water, such as, for instance, HCl or $NH_3$, is added to dry nitrogen. The sensitivity of a semiconductor device for a given gas or vapor varies a great deal depending on which electrically reactive particle is used in the standardization process. As discussed more fully in the ensuing description, the latter phenomenon opens up a number of possibilities for obtaining selectivity. From these and other facts observed applicant has formed the following picture of what occurs at the semiconductor boundary during the stabilization process. The high forward current carries a large number of majority carriers (electrons in the case of N type material) through the boundary. After combining with and neutralizing a quantity of minority carriers and cleaning the surface of the boundary by the combined action of heat and electricity, the excess of majority carriers produces a charged surface layer, especially while the forward current is being withdrawn or decreased. When electrically reactive particles are present in the ambient, they are attached to this charged layer, and form an oriented monomolecular layer. This is quite similar to the formation of the mono layers of oxygen on platinum, of hydrogen on palladium, etc., which, according to some theories, are responsible for the catalytic action of these materials. The existence of these monolayers has never been proven beyond doubt since some theorists assert that these layers consist of mixtures or nonstoichiometric chemical compounds of the metal with oxygen, hydrogen or other atoms. Whatever the exact chemical nature of these layers may be, those formed on the semiconductor boundaries of the present invention are very hard to remove, and function to maintain the surface properties very constant for long periods of time against many abuses. These layers are changed only by extreme electrical overloads and by a few substances which act as "poisons." It is also true that these layers, if not monomolecular, still are very thin, perhaps of the order of a few molecules thick, and in the case of the semiconductor devices of the present invention are of an electrically polar nature, reversibly changing various electrical characteristics of the semiconductor device by adsorption and desorption of other electrical reactive molecules and particles, as well as those of the same kind.

As thus far described, no mention has been made of the particular semiconductor material which is employed nor of the particular gases which have been found to effect certain ones of the characteristics of the semiconductor boundary. The two principal semiconductive materials which have been used are silicon and germanium, but it will be understood that other types of semiconductors may be used. Furthermore, both N and P type semiconductors with metal contacts have been employed, as well as other types of semiconductive boundaries such as PN junction diodes and PNP or NPN transistors.

It has been found that the surface states of semiconductors, and particularly silicon and germanium, are considerably affected not only by charged particles such as ions and electrons, but also by polar molecules such as water vapor, alcohol, acetone, etc. and also by those molecules which are easily polarized or ionized by weak electric fields such as, for example, oxygen, chlorine, fluorine, etc.

Experimentation shows that the absolute values of the respective electrical characteristics of a semiconductor boundary are dependent upon a number of variables other than the ambient atmosphere of the boundary. Two such variables are the preceding history and temperature of the boundary. No application of semiconductor devices for gas detection could even be contemplated before it was established: (1) that a standardization process can be performed to make the change in an electrical parameter (e.g., resistance, or current, or voltage drop) produced by a given concentration of a given gas or vapor invariable at least for some time, instead of the continuous creeping up or down as found by all previous researches; (2) that, after the standardization process referred to in (1) above has been performed, in spite of the very large variations in the absolute values of the electrical resistance R, the voltage drop V, the current passed I, etc. with contact pressure, ambient temperature, pressure, etc., the relative or percentage changes, that is, the quantities $\Delta R/R_c$, $\Delta I/I_c$ and $\Delta V/V_c$, are substantially constant where $R_c$ is the absolute electrical resistance when the semiconductor device is subject to a given gas concentration C, and $\Delta R$ is the change in absolute resistance produced by a change $\Delta C$ in the gas concentration, while the current or the applied voltage drop are kept constant. $\Delta I$ and $\Delta V$ similarly are current or voltage changes produced by $\Delta C$ while one or both of the three other quantities R, I or V is kept constant; (3) that the response time to a change in ambient can be brought down to two minutes or less instead of five to twenty minutes or more as previously required. None of these things, to the best of applicant's knowledge, has been accomplished before by any other prior art arrangement.

When the sensitivity of a semiconductor boundary is stabilized to the effects of the ambient atmosphere in accordance with the present invention, the ratio of the variation to the absolute value or the percentage change which occurs in the electrical parameters as a given quantity of electrically reactive particles of a given kind is introduced into the ambient atmosphere of the boundary is substantially constant irrespective of the absolute values of such parameters. Consequently, by always measuring the percentage changes in an electrical parameter and not the absolute magnitude, the effects of such variables as temperature, contact pressure and the like may be minimized and the apparatus which would be necessary to control or compensate for such variables will be greatly simplified.

Figure 3:
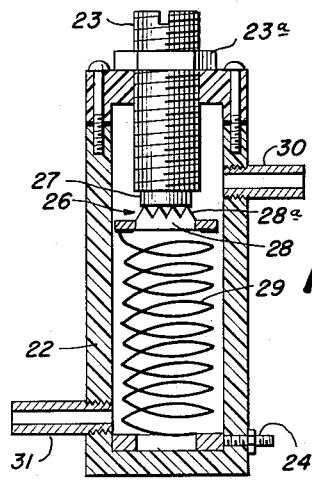
Fig. 3 illustrates another form of diode construction that may be employed in the circuit shown in Fig. 1.

For example, applicant's research shows that a freshly made germanium contact diode similar to that shown in Fig. 3 may show practically no change in its electrical resistance of 250 ohms before stabilization when the ambient atmosphere is changed from dried air to dried nitrogen and vice versa with an energization of 5 volts applied in the reverse current direction. However, after being treated with forward electric current in the stabilization process at .2 amp. a decrease of 2% in the resistance of the diode occurs when the ambient atmosphere is changed from dried air to dried nitrogen. This percentage change in resistance for a 20.5% oxygen change remains constant for extended periods of time under different operating conditions even though the absolute resistance of the diode is changed by temperature, contact pressure, etc. down to as low as 30 ohms and up to as high as 1000 ohms.

Since the percentage changes in resistance produced by a given concentration of various gases or vapors in the ambient atmosphere are quite different, ranging from changes of the order of 5% for a 1% change in water vapor concentration to 0.1% for a 1% change in oxygen concentration, the gas detector of the present invention, in combination with suitable selective absorbers, may be used to at least partially analyze the gas under test.

It should be noted also that although the sensitivity of the semiconductor boundaries to changes in ambient atmosphere, when measured in the indicated relative manner, is not necessarily improved by the stabilization of sensitivity process, constancy of this sensitivity for extended periods of time and under widely different operating characteristics is achieved. For example, changes in temperature which occur when such detectors are taken into mine shafts, manholes, etc., greatly affect the absolute resistance of the boundary but do not affect the relative change which occurs when the ambient atmosphere is changed from one gas to another after the device has been subjected to the stabilization procedure of the present invention.

Referring now to the drawings, and particularly to Fig. 1 thereof, there is shown a circuit arrangement suitable for use in a gas detector and which comprises means for stabilizing the sensitivity of a semiconductor boundary and means for measuring certain electrical characteristics of the boundary to detect the presence of electrically reactive particles in an unknown medium or ambient under test.

This circuit comprises a semiconductor type detector 10 which is connected in a balanced bridge arrangement 12, and which includes a sensing element in the form of a diode or transistor having a junction or boundary of the type indicated above, partially exposed to the ambient. As described more fully hereinafter, the ambient is introduced through an inlet in a housing enclosing the diode or transistor and flows over the boundary and through an outlet in the housing. As shown, the bridge 12 includes an ammeter 14, a voltmeter 16, an adjustable resistance device 20 and a galvanometer 18 with a center zero indication of bridge balance and a graduated scale showing degrees of deviation from center in either direction. In order to permit accurate measurement of the resistance of the semiconductor boundary in the detector 10, the adjustable resistance device 20 may be a decade resistance box, although other adjustable resistances of similar accuracy may be provided if desired.

In accordance with the present invention, a relationship between the rectifying properties of a diode and its sensitivity to vapors and gases has been found to exist. Whenever a contact between a metal and a semiconductor or, in general, between two conductors of unequal conductivity has rectifying characteristics, that is, conducts electric current in one direction more easily than in the other, there is also present sensitivity to electroreactive gases and vapors, such as, for example, water, alcohol and acetone vapors, oxygen, Cl, HCl, etc.; that is, the electric resistance after application of a certain minimum voltage in the reverse direction with air as an ambient changes when one or more of these substances is contained in the air. However, this relationship is by no means quantitative. On the contrary, elements which have quite poor characteristics as rectifiers often have high sensitivities to gases and vapors and vice versa. For example, some germanium diodes with a ratio of 3 to 1 of forward to reverse current, which are quite worthless as rectifiers, have exhibited very high sensitivity to oxygen, water vapor, alcohol. But in all cases which applicant has thus far encountered, when rectification is entirely absent, sensitivity to gases and vapors is also absent, and this has been found to be true for all rectifying contacts and junctions including those that are presumably made between pure metals, as for example, in a selenium rectifier.

Some observations on effects of ambient components upon potentials of thermocouples lead applicant to believe that the sensitivity of contacts or junctions to various fluids is directly connected with the difference in work functions of the contacting materials. The degree of rectification, while substantially determined by the difference in work function, is, however, greatly influenced by other factors and this explains the deviation from complete parallelism between sensitivity to ambients and rectifying ability.

The particular constructions of various semiconductor type diode devices suitable for use in place of the detector 10 are described in copending applications Serial No. 657,304 and Serial No. 657,343, filed concurrently herewith. However, for the purpose of promoting an understanding of the operation of the circuit shown in Fig. 1, a brief description of certain diodes and transistors which may be used in the practice of the present invention will be given.

Figure 2:
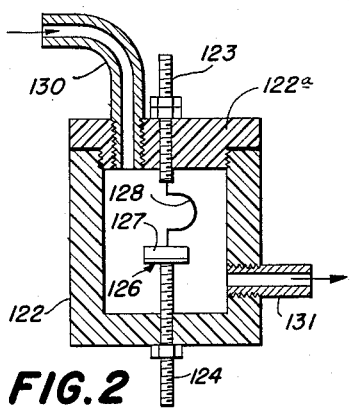
Fig. 2 shows a diode construction which may be employed in the practice of the present invention.

Accordingly, as best shown in Fig. 2, the detector 10 may consist of a housing 122 through the opposite ends of which extend conductor terminals 123 and 124 for enabling external connections to opposite sides of a semiconductor diode 126. The housing 122 is provided with an inlet conduit 130 through which a gas is admitted into the housing 122 and an outlet conduit 131 through which the gas is expelled or released. Accordingly, with this arrangement a continuous supply of gas may flow through the detector 10 past the semiconductor junction or boundary of diode 126 and a continuous measurement of certain ones of the electrical parameters thereof may be carried out by means of the bridge 12.

The diode 126 illustrated in Fig. 2 includes a semiconductor 127 in the form of a germanium wafer connected to the terminal 124 and a flexible metal wire contact 128 connected to the terminal 123. Terminal 123 is shown as being insulated from terminal 124 by the top 122a of housing 122, which top is made of plastic or other insulating material. However, a plastic bushing or other insulator could be used to insulate the terminals if a metal or conducting top was employed. The rectifying boundary is formed between the semiconductor 127 and the contact 128 but due to the relatively small area of this boundary its sensitivity is small. Thus, several such diodes must be connected in series or in parallel to produce changes in electrical parameters of such magnitude that they can be detected and observed, or alternatively, vacuum tube amplifiers must be employed.

An improved form of diode construction is illustrated in Fig. 3 wherein a housing 22 is provided with a gas inlet 30 and a gas outlet 31. A pair of spaced-apart conductor terminals 23 and 24 insulated from each other by parts of the housing are again connected electrically to opposite sides of a semiconductor diode or sensitive element 26. The conductor terminal 23 takes the form of a threaded rod having secured to its lower end a disc or wafer 27, which is preferably made of germanium or silicon but may be of any material, such as selenium or copper oxide, that provides rectification when in contact with a different conductor. The wafer 27 may take the form of a thin coating of germanium or other semiconductor formed on a graphite disc carried by the terminal 23, although this particular construction is not illustrated in the drawings. In general, when a vapor or gas differing in an electrically reactive component is admitted to a rectifying diode biased in the reverse direction, there are two more or less distinct effects: a fast one of the order of a fraction of a second, and a slow one in which equilibrium is reached in 2 minutes or longer. Applicant ascribes the reason for the slow change to the necessity for the electrons and holes in the interior to adjust themselves to the changed surface condition when the ambient is changed and then in turn influencing the surface condition. Therefore, the smaller the bulk, with respect to the surface, the faster equilibrium will be reached and, to speed up the process, thin semiconductor coatings having a thickness of less than 100 microns and as low as 50 microns are preferred.

In any event, the semiconductor 27 either in the form of a wafer or a coating on a graphite base is attached to the terminal 23 by soldering or similar known methods to provide an ohmic contact. Stainless steel is preferably used for the metal parts of the detectors illustrated in both Figs. 2 and 3 due to its freedom from attack by most corrosive gases and vapors. Of course, other metals may be employed if non-corrosive gases are to be tested.

The semiconductor 27 is engaged or contacted by a tubular or ring-shaped contact 28 having a serrated end portion as indicated at 28a. The serrations effect a concentration of power at the contact points and at the same time provide for accessibility of the contact area by the gases to be tested. The serrations should preferably have small dimensions, although, in order to make them visible, they have been greatly exaggerated in Fig. 3. In actual practice, the serrations are formed by lightly going over the annular edge of the contact 28 with a small or medium file, due to the fact that their size is not critical and they may be varied within relatively wide limits without much effect on the performance. The contact 28 is urged against the semiconductor 27 by a coil spring 29 disposed within the housing 22. One end of the spring 29 is electrically connected to the terminal 24 while the other end is connected to the contact 28 as by soldering or the like. Thus, the spring 29 serves the dual purpose of maintaining the contact 28 in engagement with the semiconductor 27 and providing an electrical connection between contact 28 and terminal 24.

Contact pressure, like temperature, has been found to have a large effect on the absolute resistance, without having any substantial effect on gas or vapor sensitivity. Means for adjusting the contact pressure and for keeping it constant are thus incorporated in the detector diode illustrated in Fig. 3. Thus, to adjust the contact pressure the rod 23 may be turned with respect to the housing 22 by means of a screw driver or the like and may thereafter be secured in the adjusted position by means of lock nut 23a.

Another type detector which may be employed in accordance with the present invention is illustrated in Fig. 9 wherein there is shown a sensing element 226 in the form of a transistor of the diffused or alloyed junction type. The particular transistor illustrated is of the PNP type having a central section 202 of an N type semiconductor, such, for example, as germanium, and emitter and collector sections 203 and 204, respectivety, of P type conductivity created at two opposed boundaries by the diffusion from two lumps of gold, indium or other acceptor type material indicated at 205 and 206. Obviously, transistors of the NPN type could also be employed, if desired. The transistor illustrated in Fig. 9 is distinguished from conventional transistors by a series of small diameter channels or gas passages 207 extending parallel to each other from one side of the transistor to the other and penetrating one or more of the boundary regions between the P and N type conductivity zones as, for example, between the zones 202 and 204. The described channels, which may be produced by mechanical drilling, serve to direct gas or fluid passing through an inlet 208 in a detector housing 209 into intimate contact with a portion of at least one of the boundaries between the N and P type conductivity zones. The gas or fluid flowing into the housing 209 is exhausted or emitted through an outlet 210.

The transistor or sensing element 226 is supported within the housing 209 upon a base 211 having a conducting portion or stem 212 extending through the bottom wall 209a of the housing. Transistor 226, as shown, is connected in a conventional common or grounded base amplifier circuit wherein an input signal is imposed through transformer 213 upon the emitter circuit between base terminal 212 and biasing battery 216, and the amplified signal is taken from the collector circuit between terminal 215 and another biasing battery 218, through output transformer 217, into a circuit provided with means (not shown) for measuring output current, output voltage, output wattage, etc. Detection and quantitative determination of electroactive components in an ambient may be carried out by measuring in the usual way amplification of the transistor before and after admission of the ambient containing such components. However, it is more practical to maintain the input signal constant as to amplitude as well as frequency, and to measure the change in output current, voltage, wattage, etc., produced by the admission of the ambient under test. Also, the device employed in the circuit of Fig. 9, may be included in one of the arms of the bridge circuits shown on other drawings of this application to replace the diodes shown. While the channels are illustrated as being formed in the collector junction or boundary, they could instead be formed in either the base or emitter junctions or even in more than one of the junctions. Moreover, the transistor could also be connected in a circuit arrangement different from the grounded base circuit shown, with appropriate changes in bias polarities and the like.

In Fig. 10 a transistor 326 of the spring contact type is employed as the sensing element. Since the construction of detector housing for the transistor 326 is substantially the same as the housing 209 described above, identical reference numerals have been employed to designate corresponding elements. This circuit connections and biasing polarities illustrated in Fig. 10 are those of a grounded base NPN transistor amplifier in which input signals are applied from source 313 between the emitter and the base with the biasing potential being supplied by battery 316 connected with the polarity indicated. The output signals appearing between the collector and the base are developed across a load resistor 317 and are measured by a suitable device 327.

The transistor 326 differs from contact type transistors previously employed in the electronics art in the following respects: (1) It employs a spring contact 319 which is formed from a strip of considerable width, as shown in Fig. 11, thereby to provide a line or area contact with an N type semiconductor wafer 320 instead of a point contact as used in prior constructions; (2) The edge of the strip 319 in contact with the wafer 320 is serrated as indicated at 319a in Fig. 11 in order to provide a number of contact points or boundaries; (3) The contact region is left open to the access of a gas or ambient flowing through the inlet 208 by means of a passage or opening 321 formed in an insulating plastic casing 322 which surrounds the rest of the device 326; and (4) The contact pressure of the strip 319 may be adjusted by a screw 323 acting upon the upper surface of a flat portion 319b of the strip and this adjusted pressure can be maintained by means of a lock nut 323a.

In view of the foregoing description it will be observed that in the arrangement shown in Fig. 10, the ambient is introduced to the emitter contact or boundary while the electric circuit characteristic measured as, for example, the voltage drop across load resistor 317 is not in the same part of the circuit but is instead in the circuit connected to the collector 324. Obviously, numerous variations are possible in the circuitry shown in Fig. 10 particularly with respect to the relative disposition of those transistor elements exposed to the ambient and those elements whose electrical characteristics are measured.

The constructions illustrated in Figs. 3, 9 and 10 each have a relatively large boundary area exposed to the ambient to be tested, and these constructions therefore exhibit large changes in their electrical parameters in response to ambient changes. The described parameter changes may be measured by the bridge circuit 12 of Figs. 1 and 4 without resort to elaborate instrumentation such as vacuum tube amplifiers and the like and also without requiring the use of several semiconductor sensing elements connected in series or in parallel. Accordingly, a detector of the type illustrated either in Figs. 3, 9 or 10 is employed in the measuring circuits described below. Thus while the measuring circuits to be described are shown using a detector of the type illustrated in Fig. 3, it will be recognized that the transistor type detectors shown in Figs. 9 and 10 could also be employed. Of course, in order to measure such changes as resistance of the boundary and the like, due regard must be taken of the terminal connections for the transistor type detectors in a manner which will be evident from the ensuing description.

Considering the bridge circuit 12 of Fig. 1 in detail, it may be seen that the detector 10 and the ammeter 14 constitute one arm of the bridge, the adjustable resistance device 20 constitutes another arm, a fixed resistance 32 and an adjustable portion 34a of the resistance in a potentiometer 34 constitute a third arm, and the remaining portion 34b of the resistance of the potentiometer 34 and an adjustable resistor 36 constitute the fourth arm. Energizing potential for the bridge 12 is provided by means of unidirectional voltage suitably provided from a storage battery 38. The battery 38 is serially connected with a manually operable on-off switch 40 and an adjustable resistance device 41 across the serial connection of the resistors 32 and 36 and the potentiometer 34. In addition, a double pole, double throw polarity reversal switch 43 is interconnected between the detector 10 and the resistor 32 so as to change the current through the exposed boundary of the semiconductor device to the forward direction for stabilizing the semiconductor device prior to the measurement of its electrical characteristics in the reverse current direction. As shown, the center terminals 46 and 47 of the switch 43 are respectively connected through conductors 48 and 49 to the conductors 24 and 23 of the detector 10, the diagonal terminals 50 and 51 of the switch 43 are connected together and the opposite diagonal posts 53 and 54 are interconnected through resistor 52.

In order to stabilize the sensitivity of the semiconductor device in the detector 10, the switch 40 is closed and the switch 43 is positioned such that the terminal 46 is connected to the terminal 51. Therefore, positive current flows from the battery 38 through the switches 40 and 43 and then passes through the exposed semiconductor boundary in the forward or low resistance direction, i.e., that direction in which both the majority and minority carriers may pass across the junction or contact boundary. With the switch 43 in this position the resistor 52 is connected in series with the exposed boundary and the ammeter and, as a result this resistor limits the current, thus protecting both the ammeter and the boundary from accidental overloads.

If the electrical characteristics of the semiconductor device are not known, i.e., the instrument has first been assembled and no tests have yet been made on the particular semiconductor device being used, the switches 40 and 43 are positioned in the manner described above and the resistor 41 is adjusted so as to gradually increase the current through the exposed boundary of the semiconductor device in small incremental steps and the readings of the ammeter 14 are observed after every step. This gradual increase of current in a step-by-step manner is continued until a rapid spontaneous increase of current is observed on the ammeter 14. This increase in current occurs when the boundary zone begins to heat up rapidly. When this marked increase in current is observed, adjustment of the resistor 41 is terminated and it is left in this position for a relatively short time, in most cases not exceeding thirty seconds. At the end of this period the resistor 41 is adjusted to substantially decrease the current through the boundary and the semiconductor device is then permitted to cool. This cooling ordinarily takes about one to two minutes, and after it has cooled the stabilization process is repeated. Experimentation has shown that three repetitions of this procedure produce a maximum of stabilization of sensitivity in all cases. The instrument is now ready for use in detecting and analyzing an ambient admitted to detector 10, and switch 43 can now be turned back into the position for making measurements on the effect of the electrically reactive particles upon the exposed boundary which is now traversed by electric current in the reverse or high resistance direction.

For a given semiconductor device of a standard design with an exposed boundary of known resistivity and of standard construction and dimensions, the current required for stabilization is quite definite. Once this current is determined by preliminary experiments for the particular semiconductor device, it is no longer necessary to carry out the process by gradual steps of current increase, but a specified forward direction current measured by the ammeter 14 can be applied for a specified time of the order of thirty seconds or less.

In order to measure the effect of the gas to be tested on the electrical characteristics of the semiconductor device, various circuits and methods may be employed. However, in utilizing the circuit of Fig. 1 for making such measurements, either the voltage across the exposed boundary, the current therethrough or the resistance of the boundary may be measured, while the other two quantities are maintained constant. If desired, instead of keeping two of these quantities constant, two or all three may be measured, and the gas concentration evaluated by means of tables or curves.

Figure 8:
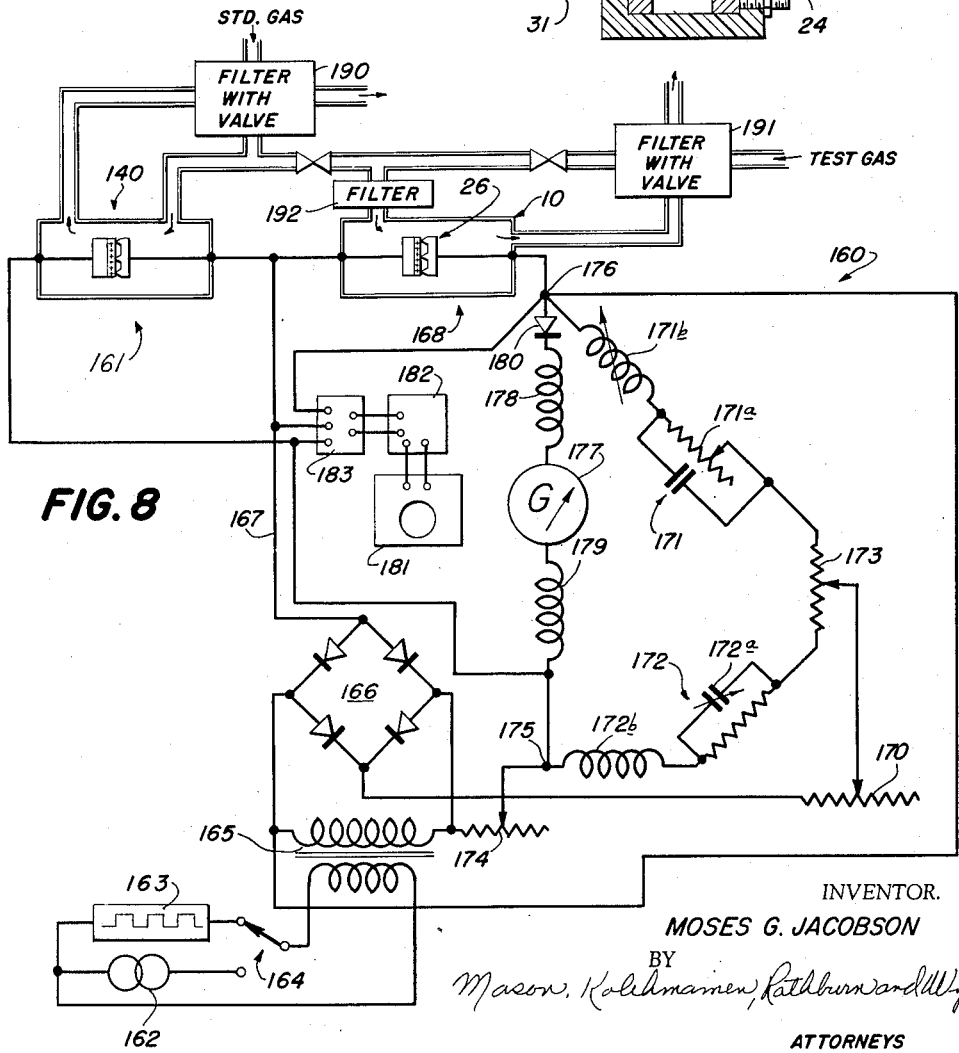
Fig. 8 shows another circuit including a compensator semiconductor device and employing A.C. either in the form of pulses or a sine wave in combination with rectified A.C. for making measurements and also for stabilizing sensitivity.
Figure 7:
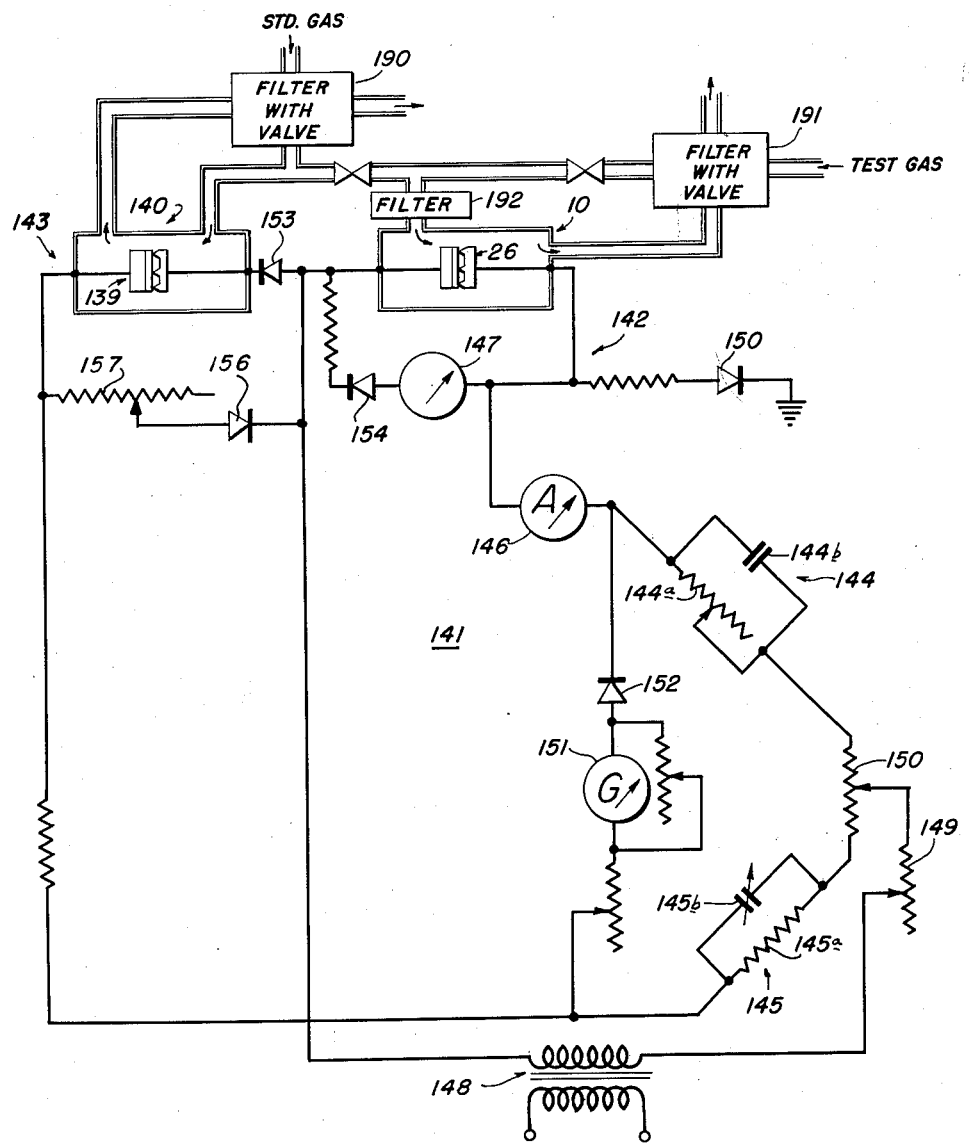
Fig. 7 shows another circuit including a compensating semiconductor device and showing the use of A.C. used both for measurement purposes and for stabilizing sensitivity.

One method of testing the gas to be detected is initially to introduce a standard gas through a suitable valve and conduit arrangement 55 into the housing of the semiconductor device and then to balance the bridge 12 by adjustment of the resistance device 20, the variable resistor 36 and the potentiometer 34 so as to minimize the current through the galvanometer 18. With the bridge 12 in a balanced condition, the valve 55 is then adjusted to cut off the supply of standard gas and a valve 57 is adjusted to introduce the test gas into the housing. This causes the heretofore described changes in the electrical characteristics of the semiconductor device which is accompanied by an unbalance of the bridge, a change in the reading in the ammeter 14 and a change in the reading of the voltmeter 16. A change in ammeter reading and a change in voltmeter reading are indicative of the presence of certain gases or particles in the test gas but a further measurement may be obtained by adjusting the resistance of the resistance box 20 to balance the bridge 12 as indicated by a null reading in the galvanometer 18. The change in the resistance of the unit 20 required to rebalance the bridge is a measurement of the change in resistance of the exposed boundary and, therefore, an indication of the quantity of and to some extent the type of electrically reactive particles in the ambient. The determination of the kind of components present without additional means for selectivity, is made possible, when these components consist of oxygen or other strongly oxidizing gases since they produce an increase in reverse resistance through semiconductor boundaries, while other electrically active components are known to produce a decrease in such resistance. Inasmuch as certain other factors such, for example, as temperature, effect the various electrical characteristics of the semiconductor device in different manners, it is desirable that a test unit also include means for measuring the current, voltage and resistance and, accordingly, all three measuring instruments are provided in the circuit arrangement of Fig. 1. Certain methods and apparatus for compensating for these other effects are illustrated in Figs. 7 and 8 and are described hereinafter.

In addition to stabilizing the sensitivity of the semiconductor device in accordance with the above technique wherein the forward unidirectional current is passed through the boundary at a value such that the boundary is operated near or just slighty below burn-out, it has been found that the sensitivity of the semiconductor device to different gases may be accentuated by setting the energizing voltage during the measuring operation to different predetermined values. More particularly, the sensitivity to different gases and vapors may be controlled to some extent by adjusting the voltage applied across the exposed boundary of the semiconductor device. To make the situation clear, what is referred to here is the change in gas sensitivity, that is, the percentage change in resistance for a given change in the test gas concentration. For example, the resistance change of a reversely biased germanium diode excited by 1.5 volts when changing the ambient from room air to dry nitrogen or vice versa may be of the order of .7 to .8%. This resistance change gradually increases to about 1.5% when the applied voltage is increased to 12.0 volts. It should be noted that the resistance itself changes with voltage much more rapidly, e.g., for the diode of the above example from 550 ohms at 1.5 volts to 620 ohms at 6 volts and to about 80 ohms at 12 volts.

When the detector 10 contains an N type semiconductor, i.e., a semiconductor in which the majority carriers are electrons, appreciable sensitivity is obtained when the measurements are taken by the application of a reverse potential across the boundary and no sensitivity at all is observed with a forward potential. However, in the case of P type semiconductors, i.e., semiconductors wherein the majority carriers are holes or localized electron deficiencies, some indication is observed even when the boundary is energized in the forward direction during measurement of the electroactive components. However, in both cases the best results are obtained when a reverse potential is applied.

Figure 4:
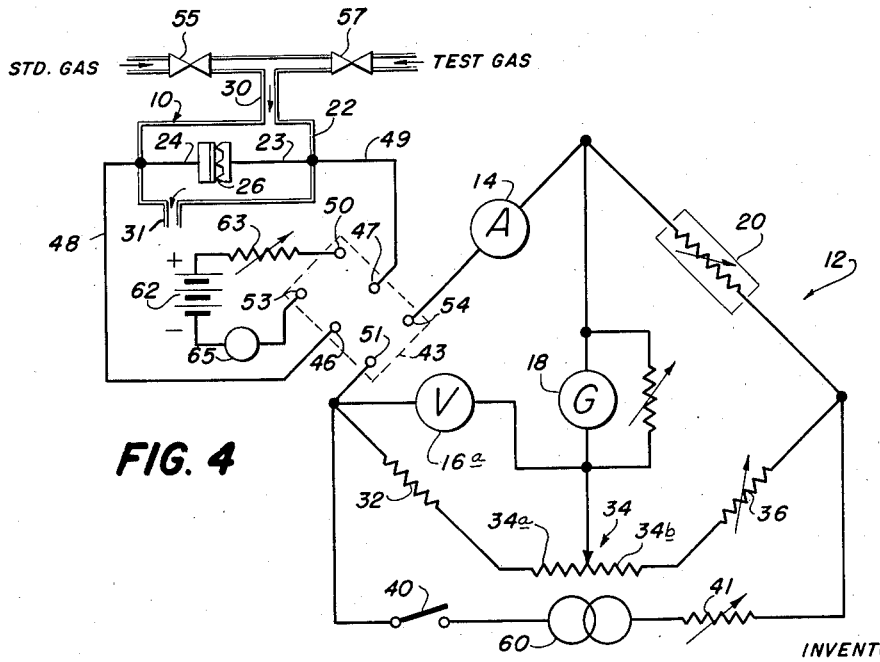
Fig. 4 illustrates an electric circuit for carrying out this invention when A.C. is employed as a source of power.

Referring now to Fig. 4, there is shown an alternative arrangement for both stabilizing the sensitivity of a semiconductor detecting device to the effects of the ambient and for measuring the changes in the electrical characteristics thereof when the ambient is changed. The circuit arrangement of Fig. 4 differs principally from that previously described in connection with Fig. 1 in that the bridge 12 is energized during the measuring operation from a source of alternating current designated in the drawing as 60. As shown, the alternating current source 60 is interconnected between the on-off switch 40 and the variable resistor 41 in the same manner as the battery 38 in the circuit arrangement of Fig. 1. Since, however, as pointed out above, it is desirable that the stabilization process be carried out by the application of a forward unidirectional voltage to the boundary between electrically dissimilar elements of the semiconductor device, it is necessary that an additional source of voltage be provided for stabilizing the sensitivity of the semiconductor device. Accordingly a circuit consisting of a source of unidirectional voltage indicated in the drawing as a battery 62, a variable resistor 63 and an ammeter 65, is connected across the terminals 53 and 50 of double pole double throw switch 43. By means of this switch unidirectional current can be passed through the exposed semiconductor boundary in the forward direction for stabilization purposes, whenever desired. The polarity of the battery connections, of course, depends upon the sign of the majority carriers at the exposed semiconductor boundary. Although the unidirectional source 62 is illustrated in the drawing as a battery, it will be understood that any other suitable source may be employed and, as a matter of fact, this source is preferably a full or half-way rectifier energized from the alternating current source 60.

In using the circuit arrangement of Fig. 4 to detect the ambient components, the stabilization of the semiconductor device is effected by actuating the switch 43 so as to connect the unidirectional voltage source 62 across the exposed boundary of the semiconductor device and the variable resistor 63 may be used in conjunction with the ammeter 65 to perform the previously described stabilizing operation. After the semiconductor device has been stabilized, the switch 43 is then actuated to the other position and the switch 40 is closed to energize the bridge 12 and to pass alternating current through the boundary. The previously described measurements may then be taken.

With A.C. power supply either in the form of sine wave excitation or pulses, a number of additional electrical parameters become available which can be utilized to measure the effect of various gases or vapors on semiconductor devices: e.g. the capacity and inductance can be measured directly by adjusting the bridge circuit to balance with the boundary first exposed to a standard gas and then in the presence of the gas to be tested, and the total impedance can be computed from the results of these measurements. Also, by observing the resulting waveforms on a cathode ray oscillograph, the change in frequency and pulse characteristics caused by the admission of the test gas may be utilized for detection of various gases and vapors. Furthermore, by adding an adjustable high pass filter before the oscillograph to pass the desired harmonics, the harmonic frequencies may be isolated, and their changes and/or the appearance of new harmonics when test gas is admitted may be utilized for detection purposes.

In connection with the use of A.C., it must be remembered that all of the semiconductor devices proposed as detectors of gases or vapors have a rectifying action; that is, very little current will be passed in the reverse direction, while a much larger current flows in the forward direction. However, as indicated above, the effect of electroactive components of the gases and vapors is strongest during the reverse current phase, while the large forward direction current is conducive to the process of sensitivity stabilization. Taking all of this into consideration, it has been found that, when employing A.C. as a source of power, better results are obtained when such electrical parameters as capacity, frequency shift, phase shift, etc., are measured instead of current, voltage and resistance as with D.C. To this end, the circuit illustrated in Fig. 5 may be employed, wherein there is shown a schematic circuit diagram of an arrangement utilizing either sine wave or square wave pulse energization of a semiconductor junction to make the measurements of the electrical characteristics described above. As shown, this circuit arrangement comprises a bridge 70 having a first arm 72 which includes the detector 10, a second arm 73 which includes an ammeter 74, a third arm 76 and a fourth arm 78. The bridge 70 is adapted to be energized through a multiposition on-off switch 80 from either a source of sine waves 81 or from a source 82 of voltage pulses. The term alternating current excitation as used in the ensuing portion of the specification and in the appended claims is intended to encompass both the sine wave and pulsed type of excitation. The cathode ray oscilloscope 84 is connected across the detector 10 so as to provide during the measuring operation an indication of either the harmonic content of the voltage developed across the semiconductor device or of the phase shift in pulses developed which phase shift occurs when the ambient is changed from a standard gas to a test gas.

Figure 5:
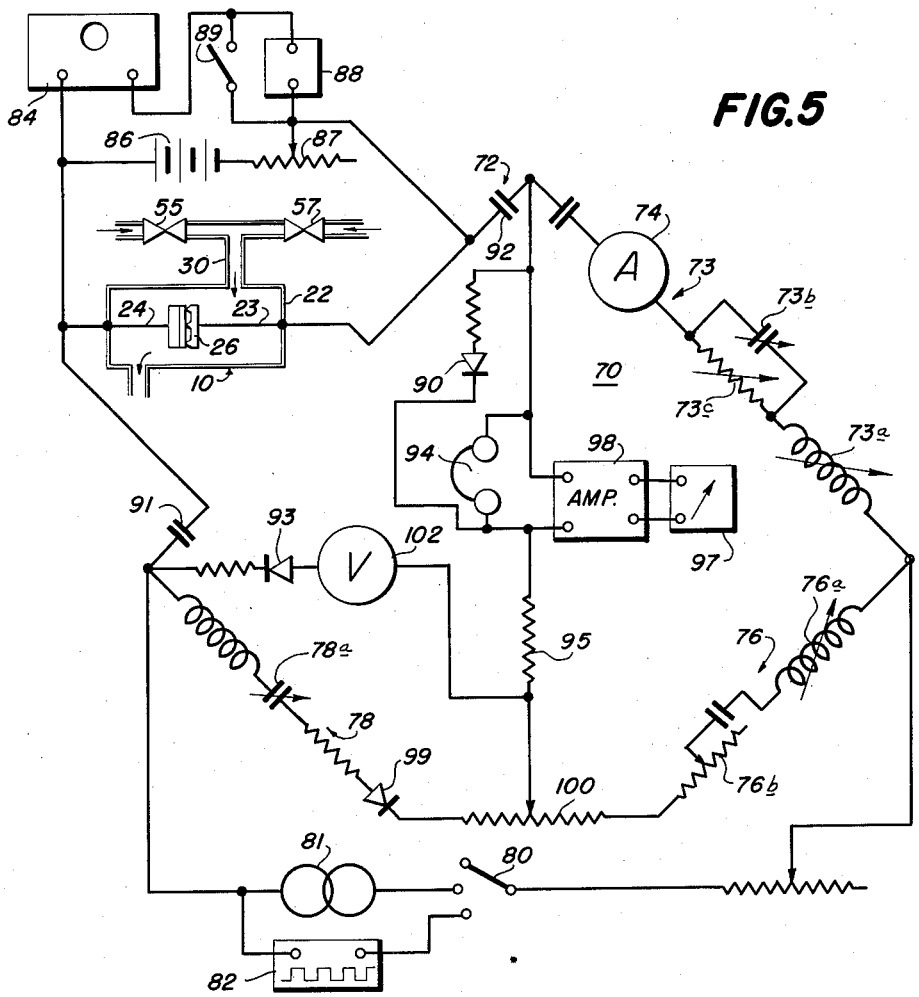
Fig. 5 illustrates another circuit in which A.C. or a pulse generator is employed as a source of power.

Considering the circuit of Fig. 5 in greater detail, it will be seen that a source of direct current voltage 86 is serially connected with an adjustable resistor 87 across the detector 10 and the cathode ray oscilloscope is serially connected with an adjustable band pass filter 88 across the exposed boundary of the semiconductor device so that when a switch 89 connected across the band pass filter 88 is open a selected band of frequencies is supplied to the cathode ray oscilloscope and may be observed on the screen thereof. The arm 72 of the bridge 70 in addition to the detector 10 includes blocking capacitors 91 and 92 protecting the A.C. meters in the bridge circuit from the direct current voltage developed by the source 86.

In order to provide a null reading instrument for balancing of the bridge 70, a suitable transducer type headset 94 is serially connected with a resistor 95 between the junction of the arms 76 and 78 and the junction of the arms 72 and 73. Moreover, a visual location of the null point may be provided by means of a suitable galvanometer 97 which is driven from an amplifier 98, the input of which is taken across the headset 94. With this arrangement, a potentiometer 100 which is connected between the arms 76 and 78 may be adjusted with the switch 80 in a closed position and a standard gas supplied to the detector 10 until the bridge is balanced as indicated by a minimum audio signal on the headset 94. At this time the gas under test is introduced into the detector 10 and the resulting changes in the readings of the A.C. ammeter and of a voltmeter 102 may be observed to detect the presence of electrically reactive particles in the test gas. Moreover, the bridge 70 may be rebalanced while the detector 10 is provided with the test gas by adjustment of the variable resistor 73c, the variable inductance 73a and variable capacitance 73b which are connected in the arm 73 with the ammeter 74, by adjustment of the variable inductance 76a and variable resistor 76b in the arm 76 and by adjustment of the variable capacitor 78a in the arm 78. These elements are all of the type which may be accurately adjusted and read. The amount of adjustment of these elements required to rebalance the bridge is, of course, an indication of the total impedance, capacity and inductance change in the exposed boundary of the semiconductor device in response to a change in ambient and these indications are, therefore, useful in determining the particular type and amount of electrically reactive particles contained in the test gas.

For the sake of simplicity of instrumentation and portability, in many cases it may be more expedient to measure current, voltage drop, or resistance as employed in the circuits shown in Figs. 1 and 4 and, accordingly, such measurements are also made in the circuit illustrated in Fig. 5. When using sine wave excitation, it is necessary to employ a device for transmitting to the D.C. galvanometer 97 only the reverse current phase going through the detector diode, while absorbing or shunting out the forward phase. To accomplish this, an amplifier 98 of a vacuum tube or transistor type may be connected to the input of the galvanometer 97. The bias and polarity of the input connections of the amplifier 98 are such that the current phase that traverses the semiconductor device in the forward direction is blocked, while the reverse current phase is transmitted and amplified.

In addition, a shunting diode 90 may be employed to prevent the forward current phase from reaching ammeter 74 and also to aid in eliminating this forward current phase from the input to galvanometer 97. A diode may also be connected in the circuit of voltmeter 102 with such polarity that the voltmeter indicates only the reverse currents while forward currents are blocked. The resistance of the voltmeter circuit is sufficiently high to prevent any substantial loss of reverse current through the detector. A diode 99 may also be employed in the arm 78 to prevent an unnecessary waste of electrical energy during the forward current phase when no measurements are being made.

The cathode ray oscilloscope 84 may be used to detect the presence of electrically reactive particles in the test gas by noting the phase shift in the signal developed across the exposed boundary of the semiconductor device when the ambient is changed. In addition, the oscilloscope may be employed to determine the effect of the change in ambient on the waveform produced across the boundary. The band pass filter 88 may be adjusted to select and isolate the different harmonics of the signal appearing across the boundary so that these harmonics may be observed on the screen of the oscilloscope, thereby to determine the effect of change of ambient upon harmonic content. All of the factors observed on the oscilloscope may be employed to aid in the determination of the composition of the ambient.

Figure 6:
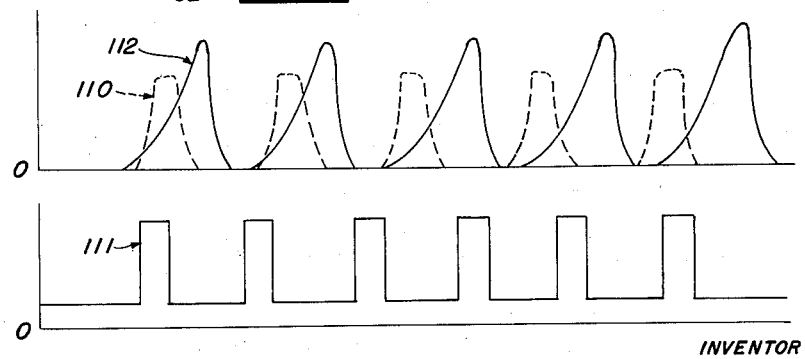
Fig. 6 is a set of waveforms useful in understanding the operation of the circuit arrangement of Fig. 5.

When pulses are employed as the excitation, the switch 80 is, of course, positioned so as to energize the bridge from the pulse source 82 and the switch 89 is open so that the oscilloscope 84 is supplied through the band pass filter 88 with selected frequencies of the composite signal developed across the exposed boundary of the semiconductor device. Referring now to Fig. 6, there are shown a number of waveforms. The waveform 111 represents the signal developed by the source 82. The waveform represented by broken line 110 is that which may be observed on the cathode ray oscilloscope 84 when the bridge 70 is energized from the source 82 and a standard atmosphere of dried air is provided for the boundary. When the ambient atmosphere of the boundary is changed to a test gas such as, for example, room air having a relative humidity of 60%, the waveform represented by solid line 112 is observed on the screen of the cathode ray oscilloscope 84. It should be noted that in these curves the ordinate is voltage, the abscissa is time and both waveforms have a zero voltage base. As shown, the spacing between pulses, the pulse width, the pulse height, and the repetition frequency of the pulses all change simultaneously. This, however, is not always the case and any one of the parameters may be chosen for measurement of the effect of a change in ambient on the semiconductor device.

The observed difference can, of course, be attributed to the fact that the capacitance and resistance of the boundary change in response to a change in ambient. In the diode illustrated in Fig. 3 the change in capacitance is generally much greater than the inductance variation and this change is accompanied by a change in R.C. time constant which distorts the wave by affecting both the pulse width and repetition rate. The change in resistance of the boundary, of course, affects the pulse height or amplitude. All of these changes can be observed on the cathode ray oscilloscope as indicated in Fig. 6 and the nature of the changes can be used to facilitate a determination of the composition of the ambient.

As previously indicated, the absolute resistance of the exposed boundary of the detector changes in response to variations in temperature, excitation voltage and the like. To minimize the effects of these variations, a compensating device having an exposed boundary similar to the exposed boundary of the detector in its resistance versus voltage characteristics as well as its resistance versus temperature characteristics, may be employed as illustrated in Fig. 7. In this connection it should be mentioned that the absolute reverse resistance as well as the forward resistance of the detector boundary varies considerably with temperature, thus necessitating the use of a compensating device having a boundary with similar characteristics. However, the effect of temperature on the gas and vapor sensitivities (percent resistance change per percent of concentration change) is small and does not have a uniform trend and, as a consequence, compensation alone by means of a semiconductor device having a sensing element similar to the detector sensing element without elaborate means for keeping the temperature of the semiconductor devices constant, is sufficient for practical purposes.

To carry out this simple compensation scheme, the compensator sensing element or semiconductor device may be surrounded by a standard atmosphere in a hermetically sealed container. However, in testing of gases—especially when the temperature etc. of the gases being tested varies considerably and rapidly, it is often preferable to subject the compensating sensing element to the same sample flow as the detector gas. To make this possible it is necessary to deprive the compensator element completely or at least to a very substantial degree of sensitivity to the components tested for. This is accomplished in the embodiment of Fig. 7 by connecting the compensator boundary 139 in the circuit in such a way that it is traversed by electric current flowing in the opposite direction from the current passing through the detector boundary, and simultaneously employing means to permit substantially only that current phase which traverses the detector boundary in the reverse direction to reach the measuring means employed. As mentioned above, it has been found that semiconductor diodes or boundaries usually have negligible sensitivity to electroactive components when polarized in the forward direction, while they exhibit very similar resistance changes resulting from variations in temperature, applied voltages, etc. regardless of the direction of current flow through the boundary. Therefore, this scheme provides a very effective quick acting compensation against variations in applied voltage, fluid temperature, fluid flow and other similar conditions.

The circuit illustrated in Fig. 7, in addition to employing a compensating device 140 as indicated above, also uses the forward current phase of the A.C. excitation voltage for stabilizing the sensitivity of the semiconductor device in detector 10. To this end, the detector is connected in a bridge circuit 141 containing means which permit both the forward and reverse current phases to pass through the boundary but which, at the same time, substantially bar passage through the measuring devices or meters of the current phase that passes the detector boundary in the forward direction while permitting substantially free passage to the measuring devices of the current phase that passes the detector boundary in the reverse direction. Thus, the detector 10 is connected in one arm 142 of the bridge, the compensating device 140 is connected in an adjoining arm 143 with reversed terminal polarity, variable resistor 144a and condenser 144b are connected in parallel in a third arm 144 and resistor 145a and variable condenser 145b are connected in parallel in a fourth arm 145. The arm 142, in addition to detector 10, includes a current measuring ammeter 146 and a voltmeter 147 connected across the exposed boundary of the detector with a half wave rectifier 154 in series. The latter rectifier is connected with such polarity that the current phase traversing the boundary of the detector in the reverse direction are passed freely while that phase passing the boundary in the forward direction are virtually suppressed or blocked. The forward current phase passing through the boundary of the detector is prevented from reaching ammeter 146 by means of a half wave rectifier 150 connected in shunt to the ammeter and polarized in a direction opposite to rectifier 154. The undesired current phase, which is in the reverse direction with respect to the exposed boundary of the semiconductor device of the compensator 140 and in the forward direction with respect to the exposed boundary of the semiconductor device in the detector 10, is prevented from going through the compensator by a half wave rectifier 153 connected in the arm 143 and this current is by-passed by a half wave rectifier 156 and adjustable resistor 157 connected in shunt with the compensator and diode 153. The resistor 157 serves to adjust the degree of compensation and also functions as a fine adjustment of bridge balance.

The bridge 141 is excited by A.C. voltage supplied through a transformer 148 one side of the secondary winding of which is connected to the junction of arms 142 and 143 while the other side is connected through a rheostat 149 to the potentiometer 150 connected between arms 144 and 145. With this circuit arrangement, both phases or half cycles of the current from the A.C. source pass through the boundary of the semiconductor device in the detector. The forward current flowing through the detector boundary is used for stabilizing the sensitivity in the manner described above and its magnitude may be controlled by adjustment of rheostat 149. As indicated above, diode 150 bypasses the forward current from ammeter 146 and from galvanometer 151, thus rendering these instruments sensitive only to the current flowing through the detector boundary in the reverse direction. A second diode may be inserted in series with the galvanometer 151 to block any remnant of the forward current phase and to prevent any surges which may occur during bridge adjustment from reaching the galvanometer. It should be noted, that in this arrangement both phases of the A.C. are passing through the detector device, while through the compensator element only that phase is allowed to pass which is in the forward direction with respect to the compensator, and thus the compensator is not subject to considerable changes from electroreactive components in the ambient. The forward phase going through the detector is continuously renewing the stabilization, while the reverse phase is producing the change in electrical parameters and is the only phase passed on to the measuring instruments. As in the previously described embodiments, either one or a combination of two or more of the electrical meter readings may be coordinated to determine the amount of electroreactive components or particles present. Also, the bridge may be used either always in the balanced condition; that is, the bridge may be balanced with a standard ambient flowing to the compensator and detector devices and may be rebalanced when the standard is replaced by the ambient undergoing test; or, alternatively, the bridge may be balanced in the presence of a standard ambient at the detector and compensator and the degree of unbalance caused by the introduction of an ambient containing electroreactive components may be measured.

Fig. 8 also illustrates a circuit employing a compensating device 140 connected in one arm 161 of a bridge circuit 160. The bridge 160 there shown is adapted to be excited either from a source 162 of sine waves or from a square wave or pulse source 163, the outputs of both of these sources being supplied through a selector switch 164 to the primary winding of an input transformer 165. The secondary winding of the latter transformer is connected to a conventional full wave rectifier 166 having its output connected to the bridge circuit 160. Thus, one output terminal of rectifier 166 is connected via conductor 167 to the junction between arms 161 and 168 of the bridge while the other output terminal of the rectifier is connected through rheostat 170 to a potentiometer 173 connected between arms 171 and 172 in the bridge. The A.C. voltage appearing across the secondary of transformer 165 is applied through a rheostat 174 across junction points 175 and 176 of the bridge. The connection of the D.C. voltage and the A.C. voltage to different pairs of bridge terminals permits use of the same bridge circuit for both D.C. and A.C. measurements in the manner described below and also permits the determination of the electrical characteristics of the detector with various combinations of A.C. and D.C.

Thus, when D.C. operation is desired, the rheostat 174 is adjusted for maximum resistance to decrease the A.C. voltage supplied to the bridge to a very small value and, hence, to reduce still further the A.C. voltage supplied to the semiconductor devices of the detector 10 and the compensator 140 since the boundaries of these two devices are in series with respect to the A.C. voltage. The effect of A.C. voltage on the D.C. measuring galvanometer 177 is further reduced by inductances 178 and 179 which possess a high inductance and a low ohmic resistance relative to the galvanometer 177.

The current flow through the exposed boundary of the semiconductor device in the detector 10 in the reverse direction is, of course, used in making the measurements. As before, the measurements are obtained by first balancing the bridge 160 in the presence of a standard gas at the devices 10 and 140 and then introducing the test gas either to the detector 10 alone or to both of the devices 10 and 140. The bridge is then rebalanced by adjustment of capacitor 172a, resistor 171a, inductance 171b, etc., and the change in resistance, capacitance, total impedance, inductance, etc., of the detector boundary is determined. As previously mentioned, the measurements are made during reverse current flow through the detector boundary at which time forward current flows through the boundary of the compensating device 140. The compensating device is therefore insensitive to the test gas but it does vary with temperature and pressure in the same manner as detector 10, thereby providing substantial compensation for such variations.

When A.C. or pulse operation is desired, the D.C. input to the bridge 160 is decreased to a minimum by adjusting rheostat 170 for maximum resistance and the A.C. input is increased by adjustment of rheostat 174. If the galvanometer 177 is highly sensitive it may be necessary to rebalance the bridge 160 after increasing rheostat 170 and prior to decreasing the resistance of rheostat 174. When A.C. is applied across junction points 175 and 176 of the bridge, the inductors 178 and 179 function as series impedances with respect to galvanometer 177 while inductors 171b and 172b in the bridge arms act as shunts due to the fact that they each possess low inductance. As a result, the four described inductors effectively protect the galvanometer 177 against A.C. voltages. At the same time a substantial portion of the applied A.C. current passes through the respective boundaries of the semiconductor devices in the detector 10 and the compensator 140. The magnitude of the A.C. current is, of course, controlled by adjustment of rheostat 174. The forward phase of the current passing through the detector boundary is used to stabilize the sensitivity as described above, while diode 180 prevents this forward current from reaching galvanometer 177. The observation and measurement of the various A.C. characteristics are preferably accomplished by means of a cathode ray oscilloscope 181 the input terminals of which are connected to a selective filter 182. The filter in turn is connected to an electronic switch 183 which functions to deliver the A.C. signals appearing across both the detector 10 and the compensator 140 through the filter 182 for simultaneous display on the screen of the oscilloscope 181, thereby to facilitate a visual comparison of these signals. As previously mentioned, filter 182 isolates the various harmonics so that the disappearance of one or more such harmonics or the addition of new harmonics in response to a change in ambient can be observed. If pulses are employed changes in pulse height, pulse width, pulse spacing, and similar characteristics resulting from change in ambient may be observed on the oscilloscope as described above.

With the arrangement shown in Fig. 8 a wide range of combinations of D.C. or A.C. can be employed for the purpose of increasing sensitivity and for selectivity and also, in some instances, to improve the stability of the sensitivity. Thus, the input frequency and the magnitude of the applied voltages can be varied to effect these results in view of the fact that the changes in boundary characteristics caused by different ambients are influenced by both the frequency and the applied voltage. Applicant has found that with D.C. operation and with A.C. operation at 60 cycles or less, the sensitization process described above lasts indefinitely. However, in operation at higher frequencies sensitivity is often lost in a relatively short time. Perhaps this phenomenon can be attributed to a turning or rearrangement of the polar molecules in definite directions at the contact or junction and/or to the electrons inside the atoms arraying themselves into states of higher energy levels. The described action requires some time, and while the forward phase of the 60 cycle current is sufficient, the forward phase of a higher frequency current, such, for example, as 1000 cycles, is too short for completion of the rearrangements and a somewhat disorderly array is produced. Therefore, when a current of 60 cycles or less is employed the sensitization is renewed during every cycle while a higher frequency current causes loss of sensitization. For this reason when higher frequency currents are employed a timing switch such as a thermally operated bimetallic switch (not shown) is preferably employed to cause a current from rectifier 166 to flow in the forward direction through the detector boundary at predetermined intervals of 15 minutes or more and for a period of about thirty seconds. This timing switch is, of course, rendered automatically effective at the prescribed intervals and the resulting current flow resensitizes the detector 10.

In view of the foregoing description, it will be recognized that the measurements provided by the various circuits described are indicative of the presence or absence of electrically reactive particles in the test gas. These measurements do not often by themselves, provide selectivity from which the composition of the test gas can be definitely ascertained. However, the following factors established by applicant's research may be used to provide a certain degree of selectivity to facilitate analysis:

(1) The semiconductor devices generally possess little or no sensitivity to the various gases and vapors when current flow is in the forward direction while they exhibit considerable selectivity in the reverse current direction.

(2) The changes in electrical parameters occur in different directions for different ambients. Thus for example, the change in resistance in the presence of $O_2$, $Cl_2$ and other electronegative molecules is in a positive direction (the resistance increases) while the change in resistance caused by water vapor, acetone, alcohol and other OH containing molecules is in a negative direction (the resistance decreases).

(3) The sensitivity to all gases and vapors is considerably dependent upon the voltage applied across the exposed boundary of the detector and, even more important, at the same voltage various gases and vapors exhibit very different sensitivities.

(4) It has been found that the actions of two or more active components in the ambient are to a high degree additive. Thus, for example, alcohol vapor, when added to a gas mixture containing a high concentration of water vapor, still produces a change in the chosen electrical characteristic substantially in proportion to the amount of alcohol vapor added. Since alcohol vapor produces an electrical change in the same direction as water vapor, i.e., a decrease in resistance, it is possible to obtain in the presence of alcohol vapor readings considerably beyond those produced by the highest possible concentration of water vapor, that is, beyond 100%.

(5) It has also been found that the electrical responses, that is, the changes in electrical parameters, are not proportional to concentration. The response is usually very intensive for concentrations starting from zero, then becomes smaller and smaller and for very high concentrations the response curve flattens out considerably. The exact shape of the response curve depends largely upon the applied voltage and to a lesser extent upon the temperature and pressure.

(6) Also, certain techniques now employed in conventional gas analyzers may be used in conjunction with the detectors of the present invention to provide limited selectivity. Among the most widely used of these techniques is the utilization of one or more filters or removing devices in the gas inlet and outlet lines in order to eliminate certain specific components. Thus, in the use of the detectors of the present invention, it is often advantageous to use as the standard gas the actual gas mixture tested either before or after the component in question has been removed by a selective filter. To this end, the circuits illustrated in Figs. 7 and 8 have been shown as including filters and valves 190 and 191 disposed in the inlets and outlets of the standard gas pipe and the test gas pipe. Each of these filters, as indicated, includes a two-way valve and a bypass line so that each filter may be selectively connected in its associated line or may be bypassed, as desired. A filter 192 may also be disposed in the gas inlet to the housing of the detector 10.

The following specific examples of the use of the detectors of the present invention will serve to illustrate how the selective filters may be employed as an aid to selectivity.

*Example #1*

The object of this application is the detection of oxygen concentration in the atmosphere, as for example in submarines or in oxygenation tents in hospitals where the relative humidity varies very widely. To carry this out, a drying filter is incorporated in the gas inlet of the detectors used in Figs. 1, 4, 5, 7 or 8 in order to remove water vapor prior to admittance of both the standard gas and the test sample to the detector cell. This filter may consist simply of a U-tube filled with granular anhydrous magnesium perchlorate

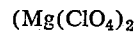

$$(Mg(ClO_4)_2$$

or Drierite which is anhydrous ($CaSO_4$). In this way only dry sample is admitted into the detector cell and also into the compensator cell when used, and the effect of varying humidity is entirely excluded. Calibration is carried out by means of analyzed mixtures of nitrogen and oxygen. Standard gas for checking of calibration usually is room air, or when this is unavailable, as in a submarine, a known mixture of nitrogen and oxygen from a cylinder is used.

*Example #2*

Measurement of concentration of water vapor (or of humidity) in a gas mixture which has no components that are absorbed in Drierite or magnesium perchlorate may be carried out by placing a drying cell either in the test gas line or the standard gas line, but not in both when only a single detector cell is used as in the circuits shown in Figs. 1, 4 and 5. When a compensator cell is used, the latter in this particular application preferably is polarized not in the opposite direction as the detector cell as shown in Figs. 7 and 8, but in the same direction (preferably the reverse current direction) and the drying element is located prior to the inlet of either the detector or the compensator cell, but not before both as in Example #1.

Example #3

Measurement of alcohol vapor in the gas exhaled by persons suspected of drunkenness can be carried out by using in place of the drying filters of Example #2 a filter that absorbs preferentially alcohol vapor, as for example, potassium dichromate and sulfuric acid on silica gel. In view of the fact that human exhalation always has very high humidity and by choosing a voltage applied to the detector and compensator diodes, at which the response curve for water vapor near 100% humidity is very flat, the effect of alcohol vapor can be enhanced to such extent that, even with small concentrations of alcohol, readings higher than 100% humidity are obtained. Thus, there is no difficulty in distinguishing between increased humidity and added alcohol vapor in quantities of 100 parts per million and more. When such an instrument is to be used to measure alcohol concentrations in mixtures other than human breath which may have humidities much below 100%, additional humidification of the sample to near 100% by adding to it air passed through a water bubbler is used.

While the invention has been described in connection with particular embodiments thereof, it will be understood that those skilled in the art may make many changes and modifications without departing from the invention. Therefore, in the appended claims it is intended to cover all such changes and modifications as fall within the true spirit and scope of the invention.

What is claimed as new and desired to be secured by Letters Patent of the United States is:

1. A method utilizing a semiconductor device for detection of electrically reactive components in an ambient comprising the steps of exposing part of a boundary formed in said device between two electrically dissimilar elements, at least one of which is a semiconductor, alternately to a standard ambient and to the ambient to be tested; and measuring the change in an electric characteristic of said device produced by the change in ambient and resulting from the effect of the ambient upon only the boundary of said device.

2. A method according to claim 1 in which the boundary between said electrically dissimilar elements is the contact zone between a metal and a semiconductor.

3. A method according to claim 1 in which the boundary between said electrically dissimilar elements is a junction between an N-type and a P-type semiconductor.

4. Apparatus for detection of electrically reactive components in an ambient comprising a semiconductor device including a boundary between two elements, which elements are substantially different in at least one electrical property, means for exposing at least part of the boundary to a fluid containing at least one electrically reactive components, means for passing a predetermined electric current for a predetermined time across said boundary while it is exposed to said ambient in order to stabilize the sensitivity of said boundary to the electrically reactive components of the ambient, and means for measuring an electrical characteristic of said device while said boundary part is exposed to a standard ambient and for measuring the change in said electrical characteristic when said standard ambient is replaced by the ambient to be tested.

5. Apparatus according to claim 4 in which the boundary between said electrically dissimilar elements is the contact zone between two materials of different electrical conductivity and in which the boundary offers substantially different electrical resistance to currents traversing the boundary in opposite directions.

6. Apparatus according to claim 4 in which said predetermined electric current is a unidirectional current crossing the boundary in the forward direction.

7. Apparatus according to claim 4 in which said predetermined electric current is a pulsating unidirectional current passing through the boundary in the forward direction.

8. Apparatus according to claim 4 in which said predetermined current is A.C.

9. Apparatus according to claim 4 in which said predetermined electric current is of a magnitude slightly below a level which may cause burnout of the boundary.

10. A method of stabilizing the sensitivity of a boundary between two electrically dissimilar elements to electrically reactive components of an ambient fluid, at least one of which is a semiconductor, comprising passing current of a predetermined value through said boundary while a portion of said boundary is exposed to an ambient containing electrically reactive components which are able to form strongly adherent thin layers on said boundary.

11. The method defined by claim 10 wherein said electrically reactive components are oxygen and water vapor.

12. A method of stabilizing the sensitivity of a boundary between electrically dissimilar elements, at least one of which is a semiconductor, to the effects of an ambient, which method comprises carrying out the steps of claim 10 a plurality of times while permitting the boundary to cool off between each of the periods when the steps are being carried out.

13. The method set forth in claim 12 wherein said plurality of times is three times.

14. A method of stabilizing the sensitivity of a boundary between electrically dissimilar elements, at least one of which is a semiconductor, to the effect of an ambient comprising the steps of passing an electric current of predetermined value through said boundary while at least a portion of said boundary is exposed to oxygen and water and maintaining said current at said value for a predetermined time, said predetermined value of current being slightly less than that which would cause burnout.

15. Apparatus for detecting the presence of electrically reactive particles in an ambient, comprising a semiconductor device having at least one boundary between electrically dissimilar elements, at least one of the elements being a semiconductor, the dissimilarity between said elements producing differences in electrical characteristics of said device depending upon the polarity of voltage applied across said boundary, means for applying a reverse electric voltage of predetermined value across said boundary, means for supplying a standard ambient for said device, means for measuring at least one of the electrical characteristics of said device resulting from the effect of the standard ambient upon only the boundary while the boundary is exposed to said standard ambient, and means for removing said standard ambient and providing for said boundary a test ambient, in order to measure the change in said one electrical characteristic which is indicative of the presence of electrically reactive particles in said test ambient and which is caused by the effect of the change in ambient upon only the boundary of said device.

16. The apparatus of claim 15 wherein said electrical characteristic is the current traversing said boundary.

17. The apparatus of claim 15 wherein said electrical characteristic is the electrical resistance of said boundary.

18. The apparatus of claim 15 wherein said electrical characteristic is the voltage drop across said boundary.

19. Apparatus for detecting the presence of electrically reactive particles in an ambient, comprising a semiconductor device having at least one boundary formed between adjoining electrically dissimilar elements, at least one of which is a semiconductor, said boundary offering different electrical resistances to currents passing therethrough in the forward and reverse directions, means for supplying a forward unidirectional current of predetermined value through said boundary for a predetermined time, means for providing an ambient to a portion of said boundary during the time that the forward current is supplied thereto by said last named means, means for passing a reverse current through said boundary, means for providing a standard ambient for said boundary while said reverse current is flowing, means for measuring an electrical characteristic of said device while said reverse current is flowing, and means for changing said standard ambient to a test ambient, whereby the presence of electrically reactive particles in said test gas is indicated by a change in said electrical characteristic of said device.

20. A fluid detector comprising a semiconductor device having at least one boundary formed by adjoining electrically dissimilar elements, at least one of which is a semiconductor, means for passing an alternating current through said boundary, means for measuring an A.C. parameter closely associated with said device while a portion of said boundary is exposed to a standard ambient, and means for admitting a test ambient to the immediate vicinity of said boundary in order to measure the change in said parameter that occurs in response to a change in the ambient to which said boundary is exposed.

21. The apparatus set forth in claim 20 wherein said alternating current is a pulsating current and the parameter measured in an electrical pulse parameter.

22. The apparatus set forth in claim 20, wherein a unidirectional current is superimposed on the alternating current passing through said boundary during the measurement of said change in the parameter.

23. In a method of detecting and quantitatively determining an electrically reactive component in a fluid under test by its effect on an electrical characteristic of a semiconductor device partly exposed to the fluid, the steps of measuring the absolute value of said characteristic when said device is exposed to a standard fluid, measuring the change in said electrical characteristic when said standard fluid is replaced by the fluid under test, and determining the ratio of the change to said absolute value as a measure of the quantity of said electrically reactive component in the test fluid.

24. Apparatus for determining the presence of an electrically reactive component in a fluid under test, comprising a semi-conductor device having a boundary between dissimilar materials at least one of which is a semiconductor, said boundary being at least partly exposed to said fluid and having an electrical characteristic which varies in response to a change in said component, an electrical circuit for measuring said electrical characteristic to determine the effect of the ambient upon the boundary only of said device, and means in said electrical circuit for measuring and indicating directly the change in said electrical characteristic when said fluid under test is replaced by a standard fluid containing a known concentration of said component.

25. Apparatus for detecting fluids comprising a rectifying device composed of electrically dissimilar solid elements, said device having at least one electrical characteristic which varies in response to a change in ambient, means for passing current through said rectifying device in a forward direction to stabilize its sensitivity, and means for passing a current through said rectifying device in a reverse direction and for measuring the change in said electrical characteristic in response to a change in ambient.

26. A gas detector comprising a housing, means defining a gas inlet to said housing, means defining a gas outlet from said housing, a pair of electrically insulated terminals on said housing, a semiconductor material within said housing electrically connected to one of said terminals, other material different from said semiconductor material and engaging said semiconductor material to form a rectifying contact, said other material being electrically connected to the other of said terminals, and means for adjusting and maintaining the contact pressure between said semiconductor material and said other material.

27. A gas detector comprising a housing, means defining a gas inlet to said housing, means defining a gas outlet from said housing, a pair of electrically insulated terminals on said housing, a semi-conductor material within said housing electrically connected to one of said terminals, other material differing from said semiconductor material and separably engaging said semiconductor material at a plurality of different points to form a rectifying boundary, and means urging said separable materials into engagement at said plurality of points, said other material being electrically connected to the other of said terminals.

28. The gas detector defined by claim 27 wherein said other material is formed by a tubular member having a serrated edge portion in engagement with said semiconductor material.

29. A gas detector comprising a housing, means defining a gas inlet to said housing, means defining a gas outlet from said housing, a pair of electrically insulated terminals on said housing, a pair of separable dissimilar materials, at least one of which is a semiconductor, in engagement with each other within said housing and cooperating to form a rectifying boundary, one of said materials being electrically connected to a first of said terminals, and a coil spring electrically connecting the other of said terminals and urging said materials into engagement.

30. A gas detector comprising a housing, means defining a gas inlet to said housing, means defining a gas outlet from said housing, a pair of spaced apart electrical terminals on said housing, a pair of dissimilar materials, at least one of which is a semi-conductor, in engagement with each other at a plurality of spaced apart points within said housing and cooperating to form a rectifying boundary, said materials being respectively connected to said terminals, and means for adjusting and maintaining the contact pressure between the materials at all of the spaced apart points.

31. The gas detector defined by claim 30 wherein one of said materials is formed by a tubular member having a serrated edge in engagement with the other material.

32. Apparatus for measurement of concentration of an electrically reactive component of an ambient comprising a detector including a semiconductor device having at least one boundary formed by adjoining electrically dissimilar materials, at least one of which is a semiconductor, means for exposing part of the boundary of said device to an ambient, a Wheatstone bridge circuit having said device connected to one of its arms, said bridge circuit containing adjustable impedance elements for balancing said bridge and means for indicating bridge balance and deviations therefrom, an alternating current source for exciting said bridge, and means in said circuit for transmitting through said indicating means only that phase of the A.C. which traverses said boundary in the reverse direction.

33. Apparatus as defined in claim 32 wherein the transmitting means comprises a rectifier in series with said indicating means.

34. Apparatus as defined in claim 32 wherein the transmitting means comprises a rectifier in shunt with said indicating means, said rectifier being connected to by-pass the A.C. traversing the detector boundary in the forward direction.

35. Apparatus for measurement of concentration of an electrically reactive component of an ambient comprising a detector including a semiconductor device having at least one boundary formed by adjoining electrically dissimilar materials, at least one of which is a semiconductor, means for exposing part of the boundary of said device to an ambient, a Wheatstone bridge circuit having said device connected in one of its arms, said bridge circuit containing adjustable impedance elements for balancing said bridge and means for indicating bridge balance and deviations therefrom, an alternating current source for exciting said bridge, a source of D.C., and means for applying at spaced predetermined intervals of time a current from said D.C. source which passes through said boundary in the forward direction while said boundary is exposed to an ambient containing electrically reactive components.

36. In an apparatus for measurement of concentration of electrically reactive components in an ambient, a semiconductor device having at least one boundary between dissimilar materials, said one boundary having an electrical property which is affected by said electrically reactive components, an electrical bridge circuit comprising four arms interconnected to form at their junction first and second pairs of bridge terminals with the terminals of each pair being diametrically opposed with respect to the bridge circuit, said bridge circuit including said boundary in one of its arms, a source of D.C. connected to the first pair of bridge terminals, means for adjusting the D.C. voltage applied across the first pair of terminals, a source of A.C. connected to the second pair of bridge terminals, means for adjusting the A.C. voltage applied to said second pair of terminals, and means in a diagonal of said bridge for measuring separately the effects of the A.C. and D.C. upon said boundary when said bridge is powered by various combinations of D.C. and A.C.

37. Apparatus for measurement of concentration of electrically reactive components in an ambient comprising a detector element and a compensator element, both including similar semiconductor devices, each of said devices having at least one rectifying boundary exposable to said ambient, said boundary being formed by adjoining electrically dissimilar elements and being sensitive to said component, a Wheatstone bridge circuit including said detector and compensator elements in adjoining bridge arms and with their exposable boundaries being connected in opposite directions to each other, means for exposing all exposable boundaries simultaneously to the ambient under test, and means in the bridge circuit to indicate the change in unbalance produced by a change in concentration of said electrically reactive components in the ambient.

38. In a detection method using a semiconductor device having a boundary between a semiconductor material and an electrically dissimilar material, the steps of exposing a portion of said boundary to an ambient containing an electrically reactive component, measuring an electrical characteristic of said device affected by said component, exposing said boundary portion to said ambient after removal of said component by a selective filtering means, measuring the change in said electrical characteristic and determining the concentration of said component by comparison of the ratio between the change in said electrical characteristic and its absolute value with data concerning the effects of known concentrations of said component on said electrical characteristic.

39. Apparatus for detecting electrically reactive fluid components comprising a first semiconductor device having at least one electrical characteristic which varies in response to a change in ambient, said device including a boundary between dissimilar elements offering different electrical resistances to current flowing therethrough in forward and reverse directions, an electrical circuit for measuring said electrical characteristic when said device is exposed to the fluid under test and including means for passing current therethrough in a first direction, and means in said electrical circuit to compensate for variations not resulting from a change in ambient, the last named means comprising a second semiconductor device substantially similar to the first semiconductor device and also exposed to the fluid under test, said second device having a boundary connected in said circuit so that it is electrically poled in the opposite direction of conduction to said first direction.

40. The apparatus defined in claim 39 wherein the first mentioned semiconductor device is poled in the reverse direction of conduction and the second mentioned semiconductor device is poled in the forward direction of conduction.

41. Apparatus for detecting an electrically reactive component in an ambient, said apparatus comprising a semiconductor device including a boundary formed between two electrically dissimilar elements, at least one of which is a semiconductor, said boundary having at least one electrical characteristic influenced by said component, means for alternately exposing at least part of said boundary to a standard ambient and to the ambient to be tested, and means for measuring the change in said electrical characteristic produced by the change in ambient and resulting from the effect of the ambient upon the boundary only of said device.

42. Apparatus according to claim 41 in which the boundary between said electrically dissimilar elements is the contact zone between a metal and a semiconductor.

43. Apparatus according to claim 41 in which the boundary between said electrically dissimilar elements is a junction between an N-type and a P-type semiconductor.

44. Apparatus for detecting fluids containing at least one electrically active component, said apparatus comprising a device including a boundary formed by engagement of dissimilar materials at least one of which is a semiconductor, said device having at least one electrical characteristic influenced by said electrically active component, means for passing a first current through said boundary in a first direction to stabilize the sensitivity of said device to said component, means for passing a second current through said boundary in the opposite direction, and means for measuring the electrical characteristic with said second current flowing.

45. The apparatus defined by claim 44 wherein the first current traverses the boundary in the forward direction and the second current passes through the boundary in the reverse direction.

46. A device for detection of a component in a fluid mixture, said device comprising two electrically dissimilar elements at least one of which is a semiconductor, a boundary between said elements, a thin film of a material electrochemically reactive with polar molecules to be detected covering said boundary and strongly adhering thereto and means for admitting said fluid to said film and withdrawing it therefrom.

47. A method utilizing for detection of electrically reactive components a device having a number of electrically different parts at least one of which is a semiconductor forming a boundary with another dissimilar part of the device, said method comprising the steps of permanently protecting against access of any ambient all of said device except parts of the boundary, alternately exposing the unprotected boundary parts to a standard ambient and to the ambient to be tested and measuring the change in an electrical characteristic of said device produced by the change in ambient and resulting from the effect of the ambient upon only the unprotected boundary parts of said device.

48. Apparatus for detecting electrically reactive components in an ambient, said apparatus comprising a detecting device having a number of electrically dissimilar parts at least one of which is a semiconductor cooperating with a dissimilar part to form a boundary in said device, a shield protecting the major portion of said device from the access of any ambient but permitting access of the ambient to at least a portion of said boundary, means for alternately exposing the unprotected boundary portion to a standard ambient and to a test ambient, and means for measuring an electrical characteristic of said device affected by the electrically reactive components of the ambient acting only upon the boundary portion, thereby to determine the effect of the change in ambient upon said electrical characteristic.

References Cited in the file of this patent

UNITED STATES PATENTS

| | | |
|---|---|---|
| 2,676,228 | Shive | Apr. 20, 1954 |
| 2,711,511 | Pientenpol | June 21, 1955 |